(12) United States Patent
Raymond et al.

(10) Patent No.: US 7,130,152 B1
(45) Date of Patent: Oct. 31, 2006

(54) HIGH TRACK DENSITY MAGNETIC RECORDING HEAD

(75) Inventors: Robert M. Raymond, Boulder, CO (US); Michael L. Leonhardt, Longmont, CO (US); Thai Nguyen, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 1678 days.

(21) Appl. No.: 09/283,958

(22) Filed: Apr. 1, 1999

(51) Int. Cl.
    *G11B 5/29* (2006.01)
(52) U.S. Cl. ..................................... 360/121
(58) Field of Classification Search ............ 360/121, 360/126, 318
    See application file for complete search history.

(56) References Cited

U.S. PATENT DOCUMENTS

| | | |
|---|---|---|
| 4,837,924 A | 6/1989 | Lazzari |
| 4,942,490 A | 7/1990 | Lehureau |
| 5,086,362 A | 2/1992 | Maurice |
| 5,124,869 A | 6/1992 | Lehureau |
| 5,274,521 A | 12/1993 | Miyauchi et al. |
| 5,452,165 A | 9/1995 | Chen et al. |
| 5,504,643 A | 4/1996 | Lazzari |
| 5,671,106 A | 9/1997 | Lehureau |
| 5,703,740 A | 12/1997 | Cohen et al. ............... 360/126 |
| 5,764,448 A | 6/1998 | Lazzari et al. |
| 5,978,188 A * | 11/1999 | Kaaden et al. ......... 360/130.32 |

FOREIGN PATENT DOCUMENTS

| | | |
|---|---|---|
| EP | 0 727 772 A | 8/1996 |
| JP | 61 113112 A | 5/1986 |
| JP | 61 137212 A | 6/1986 |
| JP | 06 223321 A | 8/1994 |

* cited by examiner

*Primary Examiner*—Allen Cao
(74) *Attorney, Agent, or Firm*—Brooks Kushman P.C.

(57) ABSTRACT

Closer spacing of elements for writing multiple tracks onto a magnetic media increases the areal density of stored information. A thin film multiple track recording head includes recording gaps in a plane parallel with the head substrate. This configuration allows for flexible placement of the elements within the head, improved control of recording gap geometry, and alternating azimuth gap angles.

33 Claims, 12 Drawing Sheets

Fig. 12

HIGH TRACK DENSITY MAGNETIC RECORDING HEAD

TECHNICAL FIELD

The present invention relates to a thin film magnetic head for high track density recording with closely spaced elements permitting simultaneous access to multiple tracks on a magnetic media.

BACKGROUND ART

Reliability, cost efficiency, and ease of use make magnetic media, such as magnetic tape, the medium of choice for many information storage and retrieval applications. Magnetic media may be made more useful and cost effective by increasing the areal density of stored information. One way of increasing areal density is to increase the track density. Track density determines the number of data tracks capable of being written onto a given width of magnetic media. Increasing the track density requires either an increase in the accuracy of head positioning or a head capable of reading and writing more closely spaced multiple tracks.

A recording head generally contains multiple write elements to simultaneously write multiple tracks for achieving a high rate of data transfer. Each write element typically includes a yoke constructed of a magnetic material. Current flowing through a conductive coil encircling a portion of the yoke induces magnetic flux in the yoke. A magnetic field is created across a gap in the yoke, inducing magnetic field patterns on magnetic media traveling by the recording head.

Constructing a recording head using thin film techniques permits the small element geometry required for high areal density recording and reduces costs by applying replication and manufacturing techniques similar to those used in integrated circuit production. Thin film write elements are typically built on a substrate with the conducting coil constructed as a spiral parallel to the substrate. The conductive coil therefore requires substantial substrate area, limiting how closely adjacent write elements can be spaced.

In tape systems, interleaving may be used to compensate for the problem of large spacing between write element gaps. In an interleaved tape system, adjacent data tracks are not written in the same pass requiring multiple passes of the tape head over the magnetic tape to fill all the data tracks. Interleaving requires highly accurate head-to-track positioning systems to properly align write gaps with data tracks. As track density increases, the head positioning accuracy to support interleaving becomes increasingly difficult.

Several designs have been proposed to reduce the spacing between write elements. In one design, the conductive coil is wound about the yoke with each loop substantially normal to the substrate. The yoke is constructed such that flux circulates in a path parallel to the substrate, limiting how closely adjacent yokes can be spaced. In addition, the recording gap is normal to the substrate, requiring difficult and complex manufacturing processes to achieve desired gap dimensions and limiting the placement of write elements in a multiple element head structure.

In another design, an array of write elements is formed with current supplied to a particular element from a row signal and a column signal in much the same way that a memory element is accessed. While this design permits close element spacing, its requirement for precise timing of row and column current pulse signals necessitates a complicated control system that limits the data rate.

The ability to read data from a particular data track while rejecting the effects of closely spaced adjacent tracks can be enhanced by using alternating write element gap azimuth angles. The gap azimuth angle can be defined as the angle made by the gap opening relative to a reference line drawn through the center of the gaps. Typical azimuth angles may alternate between +15° and −15° or more for adjacent write gaps.

What is needed is a write element design permitting close spacing of recording gaps, alternating azimuth angles between gaps, and the ability to place elements in a variety of two dimensional geometric configurations. Each write element should have a gap opening that can be constructed using standard thin film processing techniques. The write elements should be electrically driven by conventional, non-array means.

DISCLOSURE OF INVENTION

It is an object of the present invention to provide increased track density by more closely spacing write elements across the magnetic media.

Another object of the present invention is to provide densely packed write elements with recording gaps parallel to the substrate plane thereby permitting accurate manufacturing of gap dimensions and element placement through standard thin film processing techniques.

Still another object of the present invention is to provide densely packed write elements that operate using conventional non-array drive signals.

Yet another object of the present invention is to provide alternating gap azimuth angles in a planar recording head.

In carrying out the above objects and other objects and features of the present invention, a magnetic recording head for writing multiple tracks onto a magnetic media traveling across the head in a media direction is provided. The head includes thin film write elements. Each element has a yoke defining a gap at one end. Each gap is substantially aligned along a position line with the yokes alternately positioned on either side of the position line. The head may include sets of write elements with each set of elements having an associated position line.

In an embodiment of the present invention, each yoke is formed on a substrate to have a front region defining the gap and a back region admitting a conductive coil. Each yoke is formed as an upper section and a lower section separated in a portion of the yoke under the gap by an insulating layer. A read element, such as a magnetoresistive device, may be located in the insulating layer under the gap. Alternately, the write element may inductively sense field patterns written onto a magnetic media data track for read back.

In another embodiment of the present invention, each gap has a gap angle with the position line. Each write element gap angle has the same magnitude but the opposite sign from the gap angle of the gap on an adjacent write element thereby achieving an alternating azimuth configuration.

In yet another embodiment of the present invention, the position line is normal to the media direction. In an alternative embodiment, the position line forms an acute angle with the media direction.

Another magnetic recording head for writing multiple tracks onto a magnetic media includes a plurality of write elements, each write element including a substrate parallel to the magnetic media as the media travels across the head. A first magnetic layer is deposited on a portion of the substrate forming the lower section of a yoke. An insulating layer is deposited over a center portion of the yoke lower section. A second magnetic layer is deposited over the insulating layer and portions of the yoke lower section forming the upper section of the yoke. The yoke upper section has a back region and a front region extending from the back region. The yoke upper section front region defines a gap. A conductive coil includes loops with each loop having a portion passing within the yoke. Current passing through the conductive coil induces magnetic flux in the yoke. The magnetic flux writes one of the multiple tracks as the media passes across the gap.

In an embodiment of the present invention, each write element has an orientation direction defined by a line from the yoke back region to the yoke front region. Each write element has at least one neighboring element having the opposing orientation direction. In a refinement, the front region of each write element yoke upper section is adjacent to the yoke upper section front region of the neighboring write element. In a further refinement, the gap is defined as a slit across the yoke upper section front region at a gap angle relative to the written data track. The gap angle of each write element is different than the gap angle of neighboring write elements.

A method for making a multiple write element magnetic recording head is also provided. The method includes forming a substrate. A yoke is formed on the substrate top surface for each write element. Each yoke has a back region admitting a conductive coil and a front region defining a gap. Each yoke is positioned so that each gap is substantially aligned along a position line and so that yoke back regions lie alternately on either side of the position line The above objects and other objects, features, and advantages of the present invention are readily apparent from the following detailed description of the best mode for carrying out the invention when taken in connection with the accompanying drawings.

BRIEF DESCRIPTION OF DRAWINGS

FIGS. 2a–10b illustrate a process that may be used manufacture one element in a multiple element tape head according to an embodiment of the present invention;

BEST MODE FOR CARRYING OUT THE INVENTION

Figure 1:
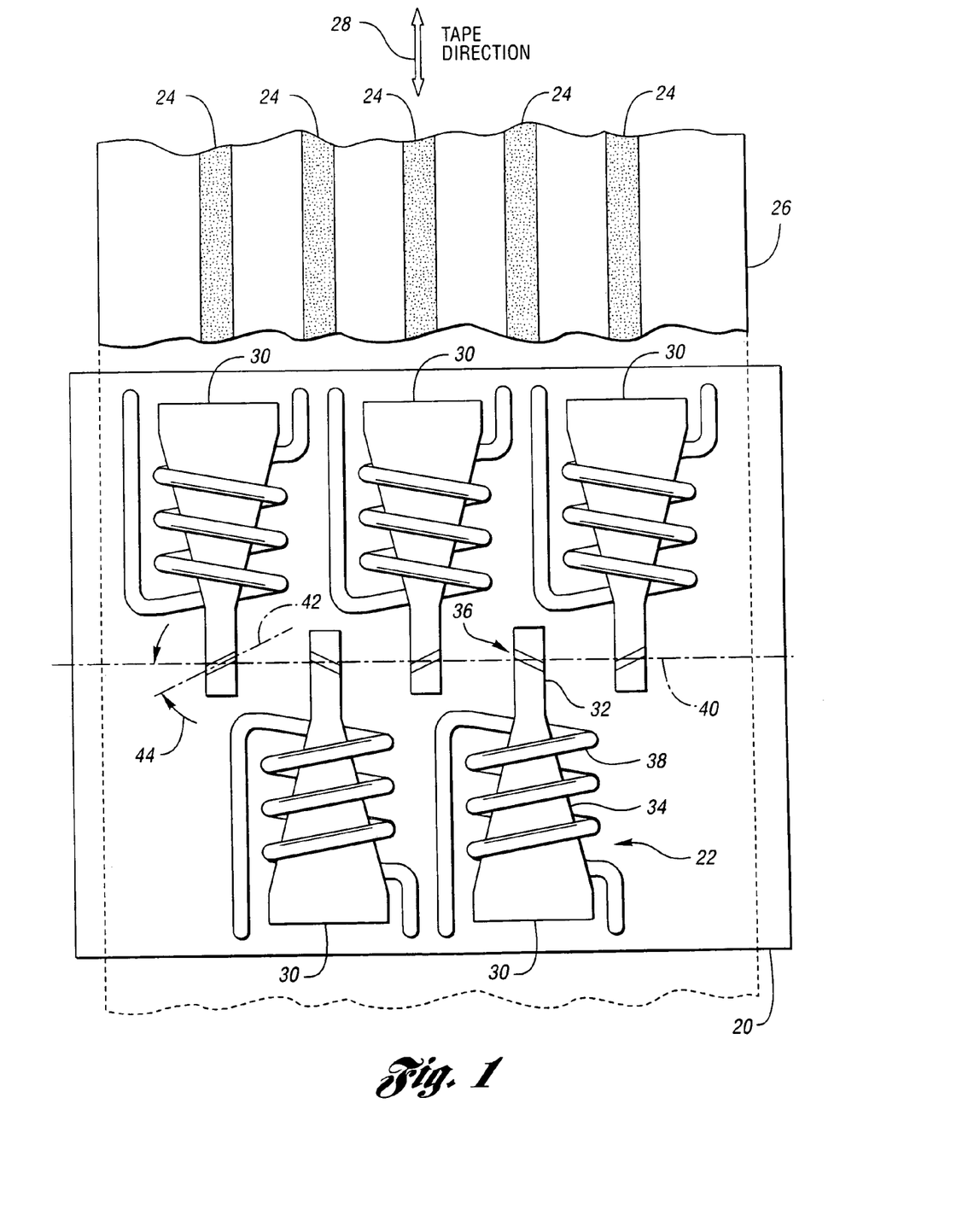
FIG. 1 is a conceptualized drawing of the top view of a tape head according to an embodiment of the present invention.

Referring to FIG. 1, a conceptualized drawing of the top view of a tape head according to an embodiment of the present invention is shown. Tape head 20 contains multiple write elements, one of which is indicated generally by 22, for simultaneously writing data tracks 24 on magnetic tape 26 as tape 26 travels across tape head 20 in tape direction 28. Each write element 22 includes yoke 30 having front region 32 and back region 34. Each yoke 30 includes an upper section connected with a lower section beneath the upper section shown in FIG. 1. The upper section of yoke front region 32 defines gap 36. Yoke back region 34 admits conductive coil 38. The plane of each loop of conductive coil 38 is generally normal to tape 26. Loops of conductive coil 38 may encircle the upper section of yoke 30 as shown or, preferably, may encircle the lower portion of yoke 30 as described with regards to FIGS. 2 through 10 below. Other coil configurations may be used resulting in a different spacing efficiency between write elements 22. Current passing through conductive coil 38 induces magnetic flux in yoke 30. This magnetic flux creates a magnetic field across gap 36 writing information onto data track 24 as tape 26 passes over gap 36. Each gap 36 is substantially aligned along position line 40. Yokes 30 are alternately positioned to lie on either side of position line 40. By alternating the orientation direction of yokes 30, write elements 22 may be more closely spaced on tape head 20, permitting an increased number of data tracks 24 for a given width across magnetic tape 26.

Each gap 36 has gap axis 42 through the longest portion of gap 36. Gap angle 44 is defined as the angle from position line 40 to gap axis 42. In a preferred embodiment of the present invention, the magnitude of gap angle 44 is the same for each write element 22 and the sign of gap angle 44 is opposite from gap angle 44 for gap 36 operative to write an adjacent data track 24. For the embodiment shown in FIG. 1, the sign of gap angle 44 is opposite between adjacent write elements 22. Changing gap angle 44 between write elements 22 writing adjacent data tracks 24 reduces the interference from adjacent tracks 24 during a read operation.

In FIG. 1, position line 40 corresponds to a gap line extending through the center of each gap 36. However, embodiments of the present invention permit write elements 20 to be located with gaps 36 moved away from position line 40. Such a configuration is described with regards to FIG. 12 below. Also, the angle between position line 40 and tape direction 28 may take on a wide range of values to accommodate various two dimensional geometric configurations and placements for write elements 22. Further, position line 40 does not necessarily have to be a straight line. While FIG. 1 illustrates a magnetic tape system, tape head 20 may be modified to access any magnetic media within the spirit and scope of the present invention.

Referring now to FIGS. 2a–10b, a process that may be used to manufacture one thin film element in a multiple element tape head according to an embodiment of the present invention is shown. FIGS. 2a–10a illustrate a top view of the manufacturing process with some layers shown as transparent to better illustrate element structure. FIGS. 2b–10b are cross-sections illustrating layer build-up for corresponding FIGS. 2a–10a.

Figure 2A:
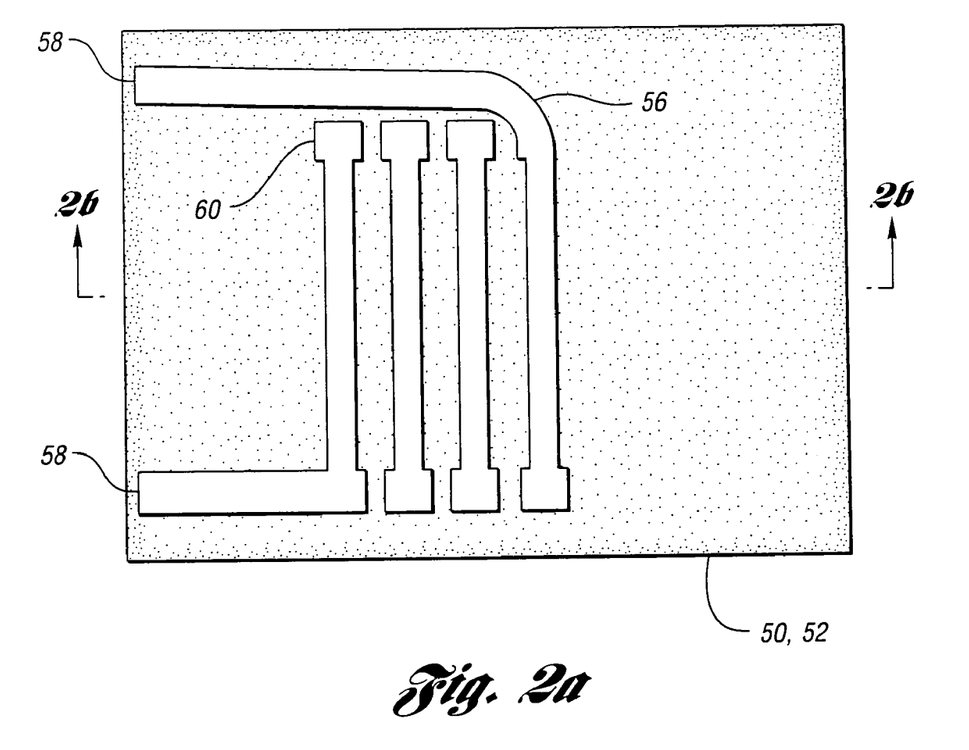
Figure 2B:
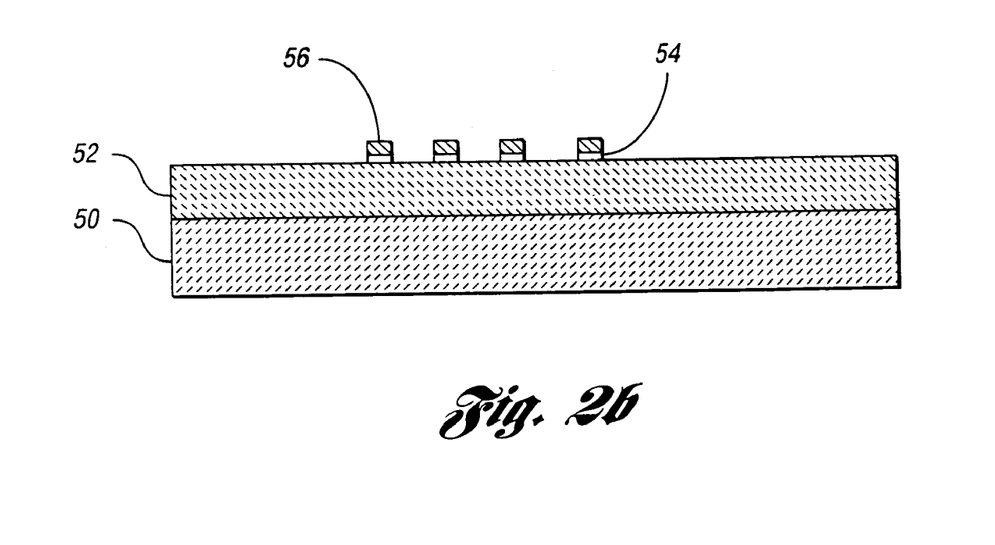

Referring now to FIGS. 2a and 2b, processing starts with a polished Al$_2$O$_3$TiC substrate 50 having thickness and area dimensions as required to meet mechanical specifications for tape head 20. During the operation of tape head 20, substrate 50 is parallel to magnetic tape 26 as tape 26 passes write elements 22. Layer 52 of Al$_2$O$_3$ is sputtered onto substrate 50 and polished so that the surface is smooth and the thickness of layer 52 is between approximately 5 and 10 µm. To construct the lower portion of coil 38, seed layer 54 consisting of a conducting material such as NiFe or copper is first sputtered onto layer 52 to a thickness of approximately 1,000 Å. A 4 µm thick layer of photoresist with openings defining the lower geometry of conduction coil 38 is then applied. Copper bottom coil section 56 is then electroplated into the photoresist pattern to a depth of approximately 2–3 µm. Coil connection points 58 connect to traces which run to the edge of tape head 20. These traces connect to cabling which supplies conductive coil 38 with current during the operation of write element 22. Traces and cabling are not shown for clarity. Bottom coil section 56 also includes pads, one of which is indicated by 60, which form the base for vias connecting bottom coil section 56 to the remainder of conductive coil 38. The photoresist is removed and the entire surface ion milled to remove seed layer 54 which is not beneath bottom coil section 56.

Figure 3A:
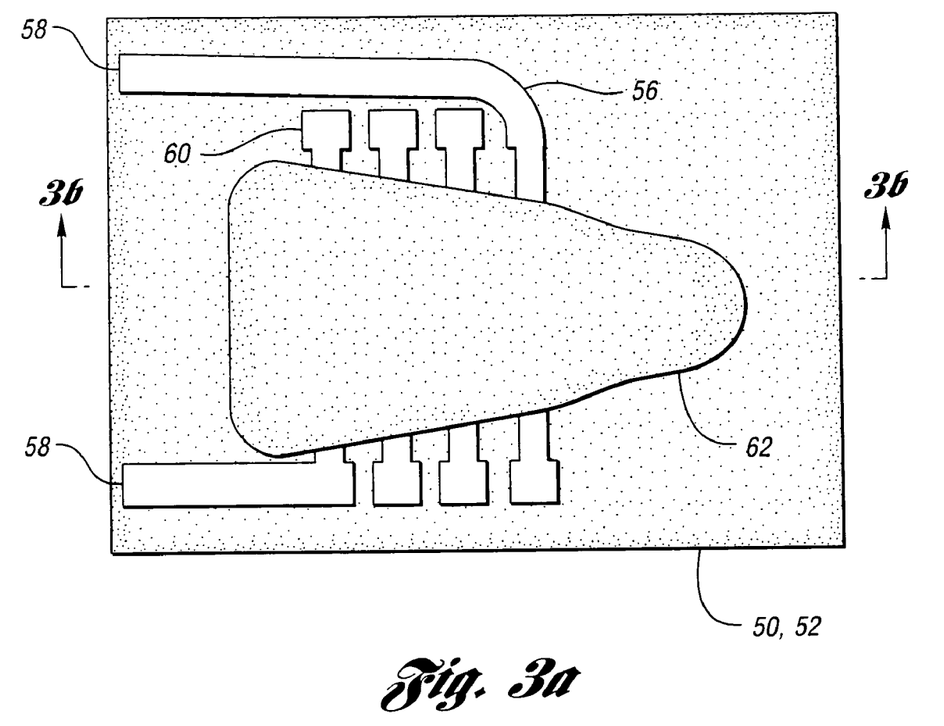
Figure 3B:
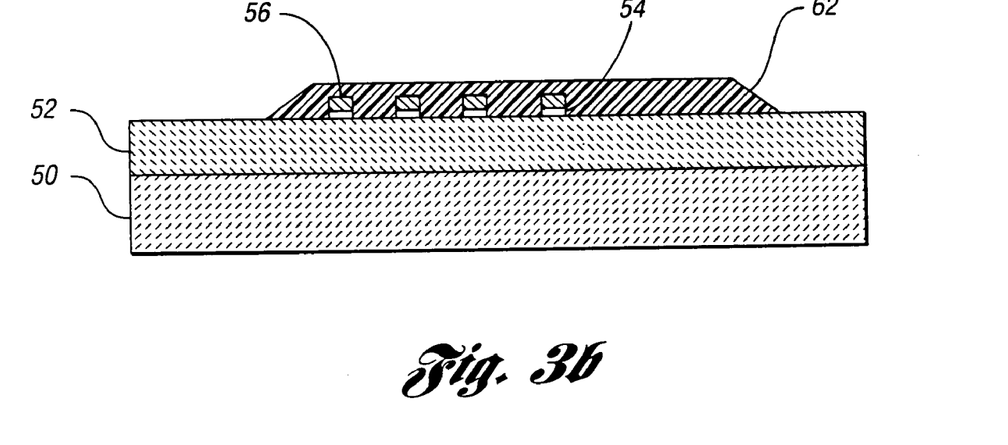

Referring now to FIGS. 3a and 3b, bottom coil section 56 is partially covered by photoresist layer 62 to a depth at least sufficient to cover bottom coil section 56 and to provide a smooth surface for subsequent processing. Photoresist layer 62 is baked and processed to become stable. Photoresist layer 62 becomes part of the structure of write element 22, providing planarization and insulation.

Figure 4A:
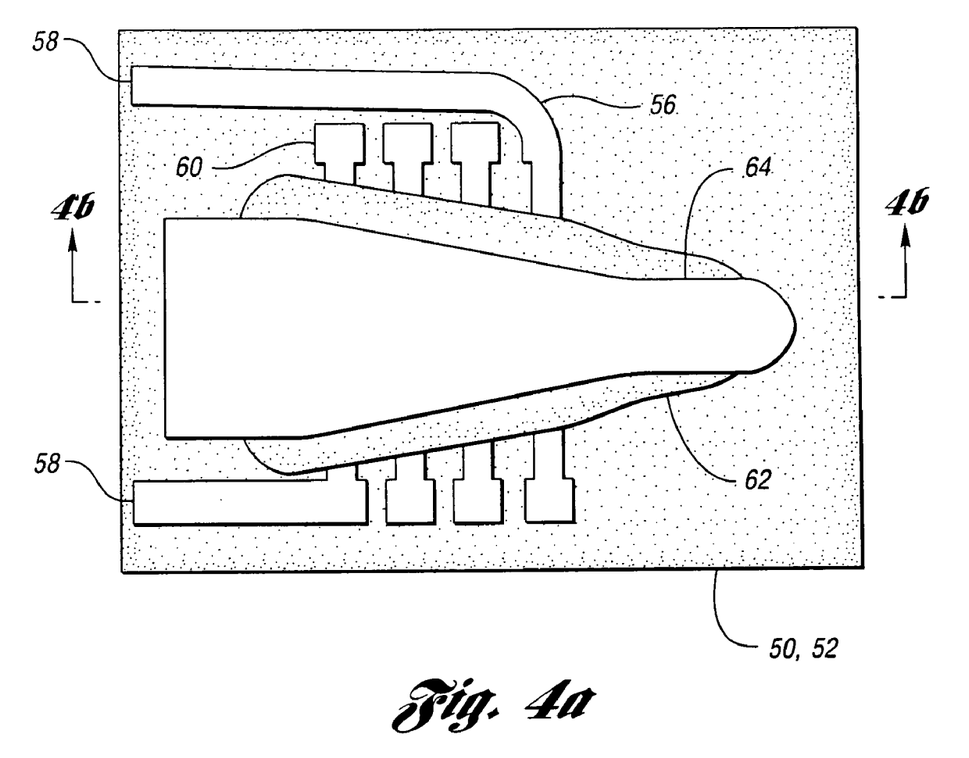
Figure 4B:
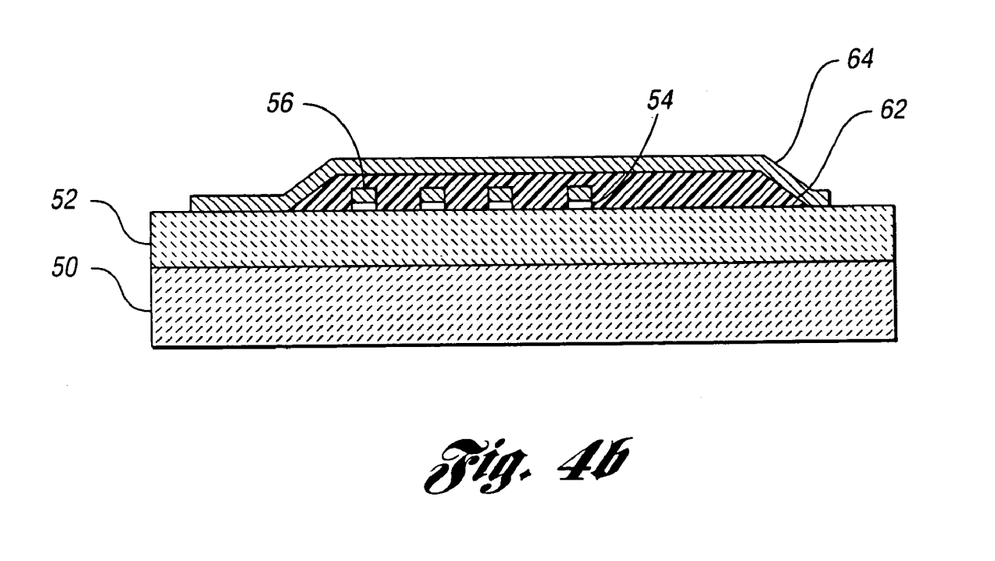

Referring now to FIGS. 4a and 4b, yoke lower section 64 is produced by first sputtering a NiFe seed layer approximately 1,000 Å thick to form a conductive surface for plating yoke lower section 64. Photoresist is applied to define the pattern for yoke lower section 64. A magnetic material, such as NiFe, is electroplated to a thickness as required by the design but typically approximately 3–5 µm. The photoresist is removed leaving yoke lower section 64 and the seed layer is removed by a process such as ion milling.

Figure 5A:
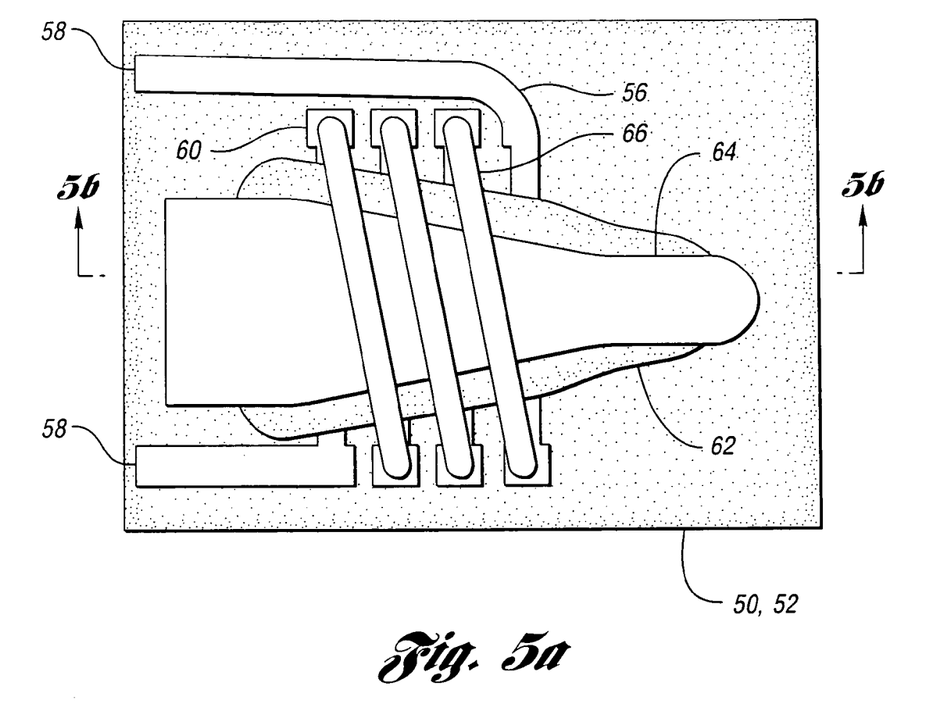
Figure 5B:
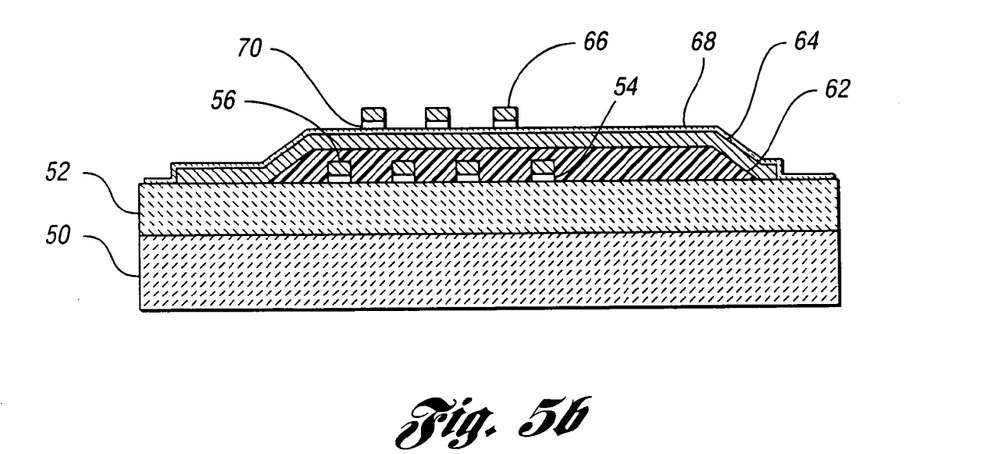

Referring now to FIGS. 5a and 5b, top coil section 66 is deposited in the same manner as bottom coil section 56. Insulating layer 68 of approximately 1 µm thick $Al_2O_3$ is first sputtered onto yoke lower section 64 to electrically insulate yoke lower section 64 from top coil section 66. Vias are etched in insulating layer 68 above pads 60. Seed layer 70, composed of NiFe or copper, is sputtered to a thickness of approximately 1,000 Å onto insulating layer 68. Photoresist is applied defining the shape of top coil section 66 and copper is electroplated to a thickness of approximately 2–3 µm as required by the design to form top coil section 66. The photoresist is then removed and the seed layer is removed by a process such as ion milling. Top coil section 66 and bottom coil section 56 form conductive coil 38 with loops generally normal to substrate 50.

Figure 6A:
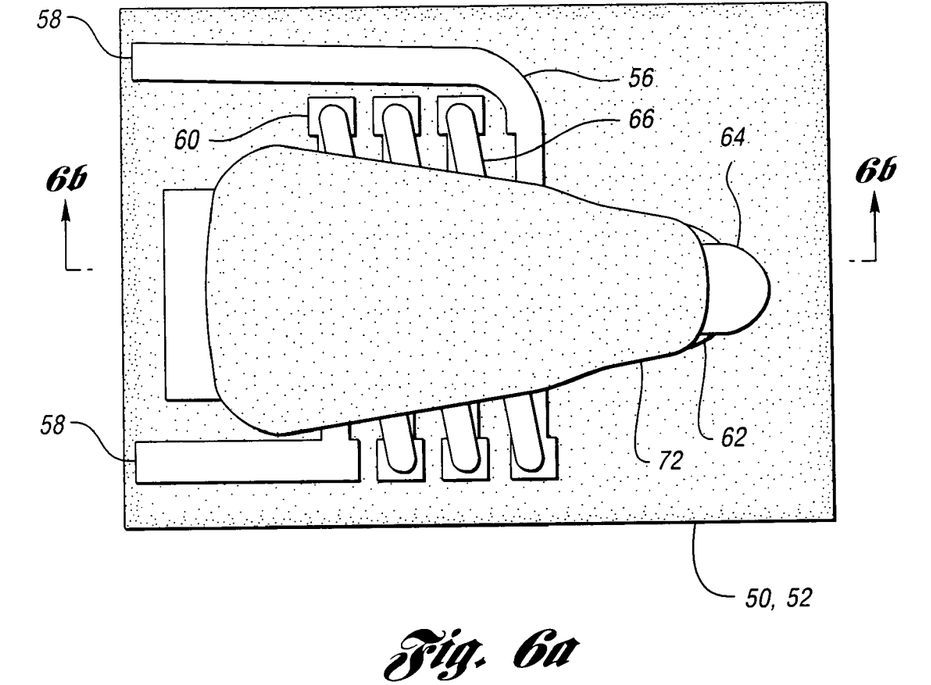
Figure 6B:
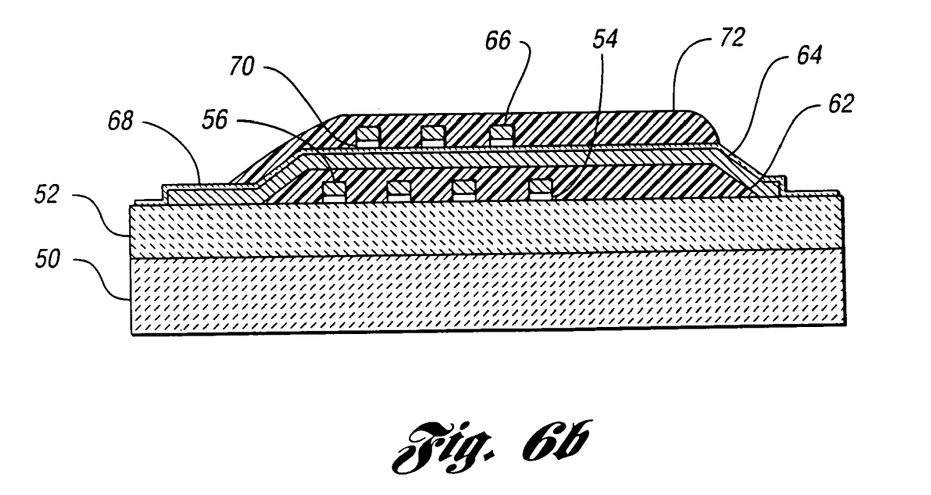

Referring now to FIGS. 6a and 6b, top coil section 66 is planarized and insulated with photoresist layer 72. Photoresist is applied to a thickness at least sufficient enough to cover top coil section 66. Portions of the photoresist are removed to form photoresist layer 72 which is then baked and processed to become stable.

Figure 7A:
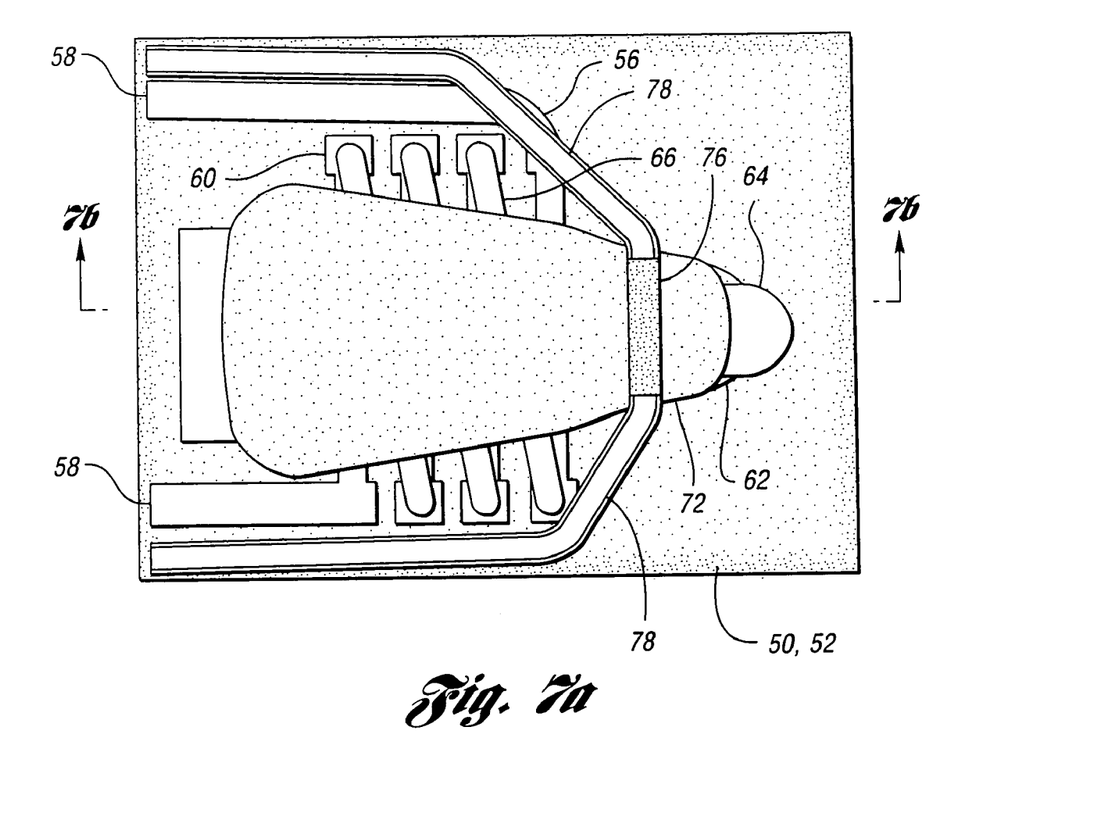
Figure 7B:
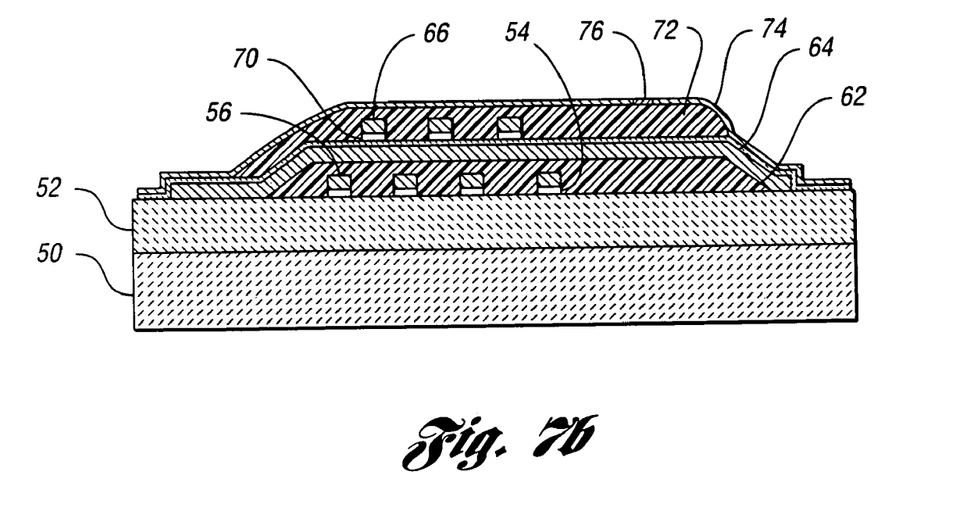

Referring now to FIGS. 7a and 7b, seed layer 74 of NiFe is sputtered to a thickness of from approximately 1,000 to 2,000 Å. In an embodiment of the present invention, write element 22 incorporates a flux sensing read element such as magnetoresistive read element 76. Seed layer 74 is etched away in regions where read element 76 and read element conductors 78 are to be formed. Read element 76 and read element conductors 78 are then deposited. The construction and operation of magnetoresistive read elements are well known in the art of magnetic tape heads. Magnetoresistive read elements that may be incorporated into a write element are described in U.S. Pat. No. 5,504,643 titled "Magnetic Read/Write Head Having A Writing-Compensated Magnetoresistant Element" and U.S. Pat. No. 5,764,448 titled "Magnetic Read Head Having A Multilayer Magnetoresistant Element And A Concentrator, As Well As Its Production Process", each of which is incorporated herein by reference. In an alternative embodiment of the present invention, write element 22 may be formed to function as a read element by inductively sensing field patterns written onto data track 24 as is known in the art.

Figure 8A:
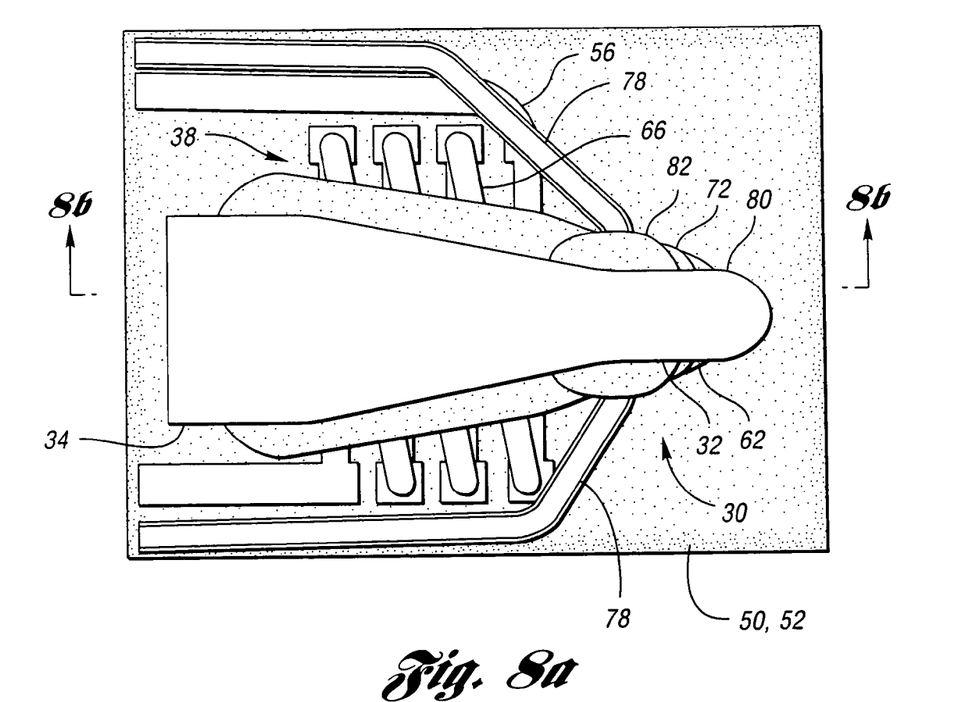
Figure 8B:
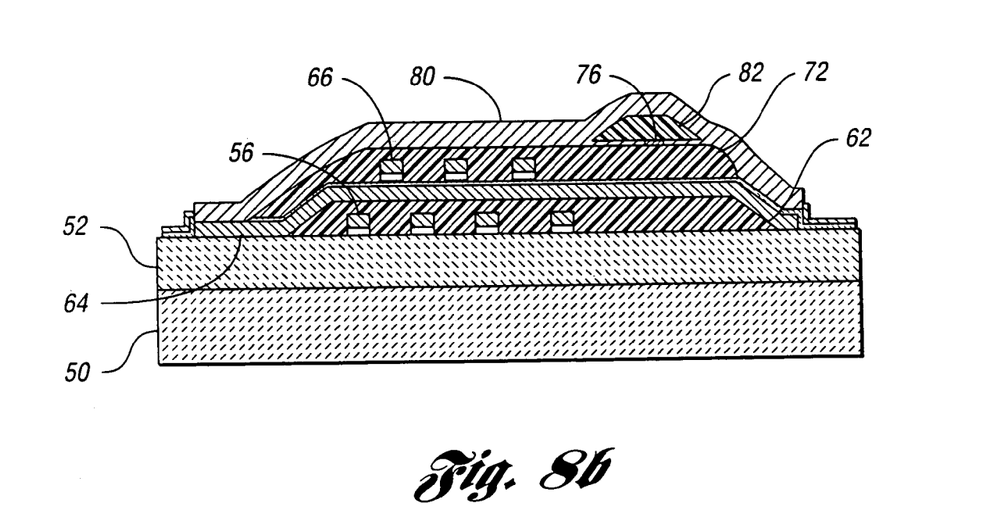

Referring now to FIGS. 8a and 8b, yoke upper section 80 is formed. Photoresist layer 82 is deposited over seed layer 74 and, if included, read element 76, beneath the area that will become gap 36. Photoresist layer 82 is then baked hard. Photoresist layer 82 insulates read element 76 and raises the region around gap 36 so that gap 36 may be exposed to tape 26. Upper yoke section 80 is then formed in a manner similar to yoke lower section 64 as described with regard to FIGS. 4a and 4b above. The thickness of yoke upper section 80 is approximately 1 to 2 µm. The shape of yoke upper section 80 is generally the same as yoke lower section 64. The width of yoke upper section 80 tapers gradually from back region 34 to narrower front region 32 to reduce magnetic saturation effects. Yoke upper section 80 and yoke lower section 64 form yoke 30. Current in conductive coil 38 causes flux to circulate in yoke 30 in a path normal to substrate 50.

Figure 9A:
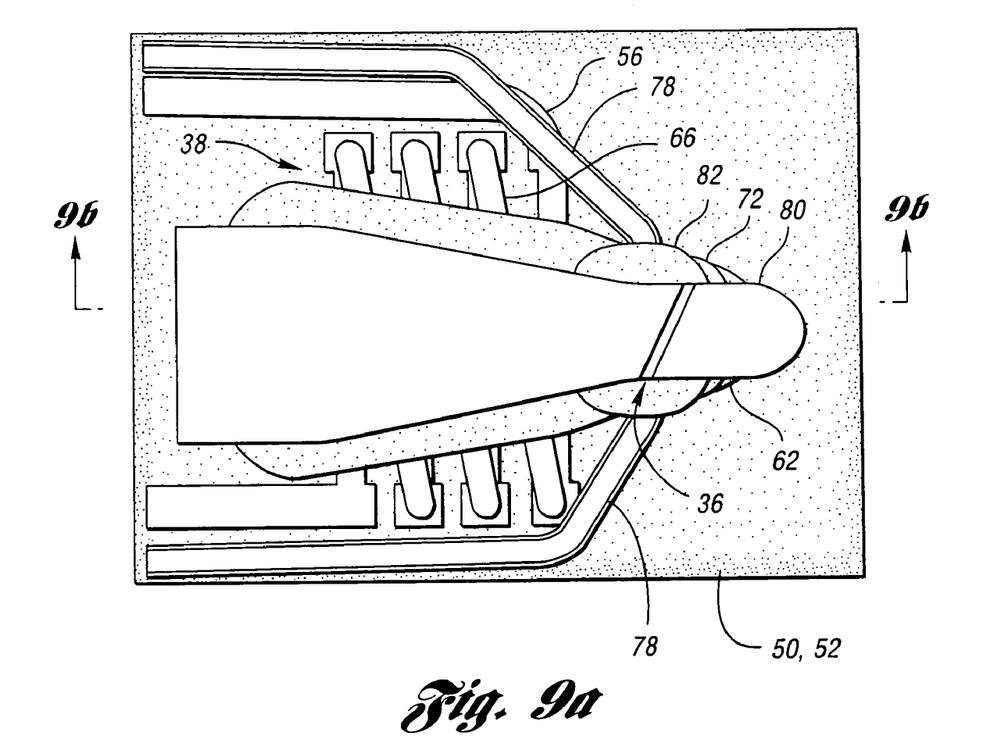
Figure 9B:
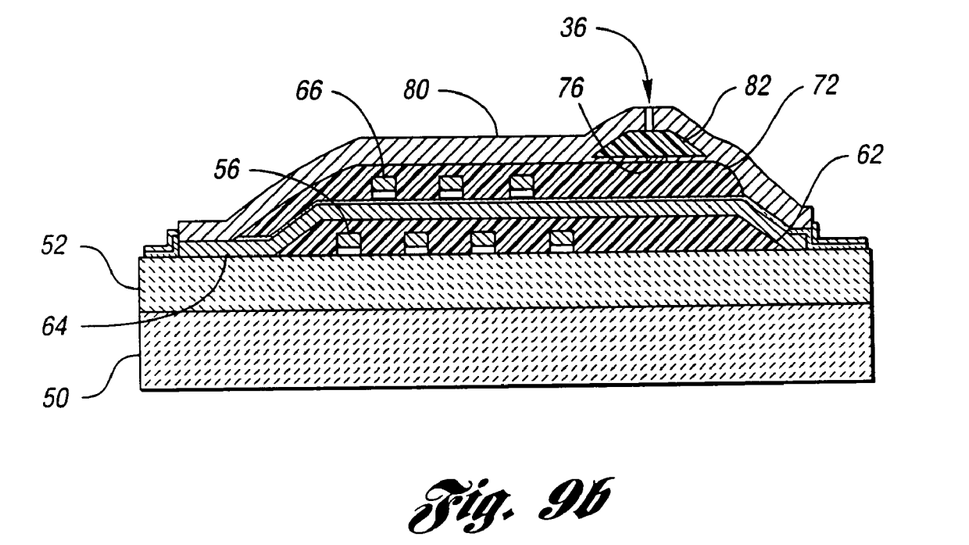

Referring now to FIGS. 9a and 9b, gap 36 is etched in yoke upper section 80 with a focused ion beam. Gap 36 may then be filled with any non-magnetic substance consistent with the focused ion beam process and the desired properties of write element 22. Since gap 36 is parallel to substrate 50, gap 36 may be precisely formed by thin film manufacturing processes such as focused ion beam etching.

Figure 10A:
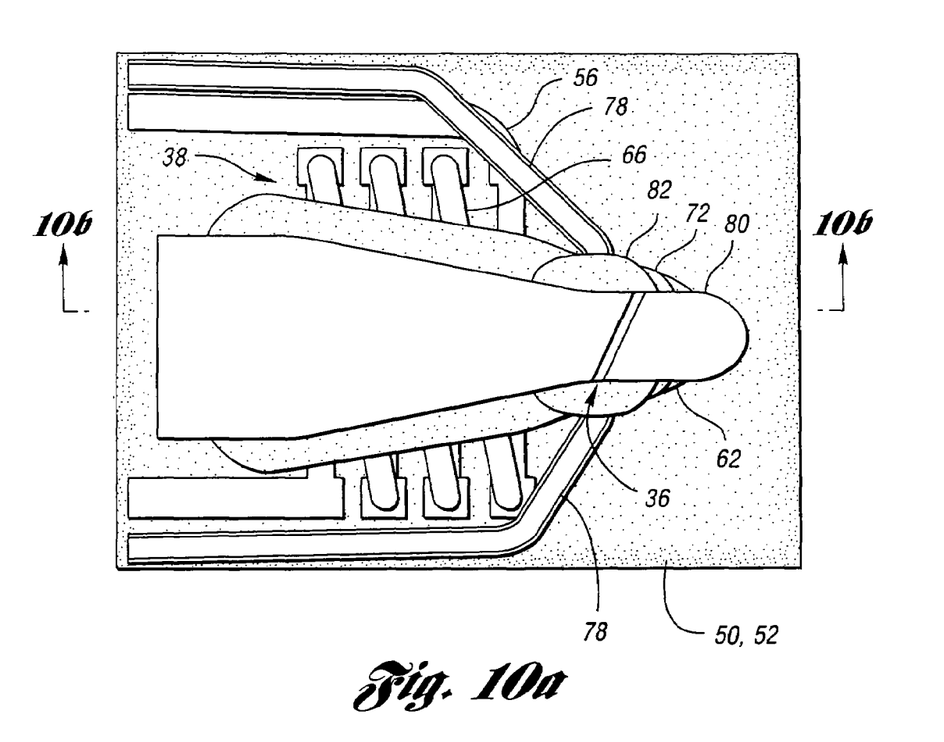
Figure 10B:
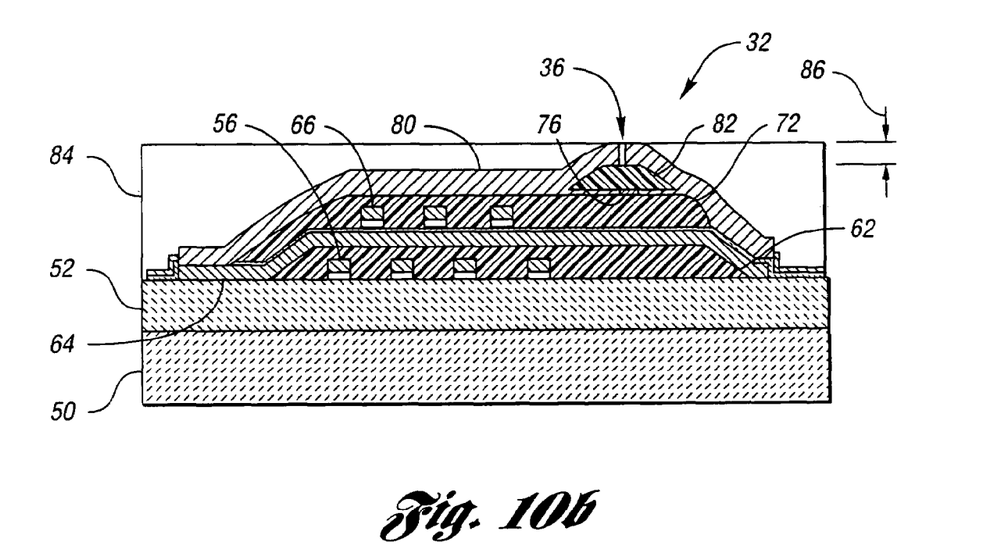

Referring now to FIGS. 10a and 10b, $Al_2O_3$ layer 84 is sputtered over write head 20, covering gap 36. Layer 84 is then lapped back to expose gap 36 and control throat height 86. Throat height 86 is an important parameter in determining the operating characteristics of write element 22. The resulting lapped surface is parallel to both the plane of substrate 50 and the plane of magnetic tape 26 or other magnetic media passing across element 22.

Figure 11:
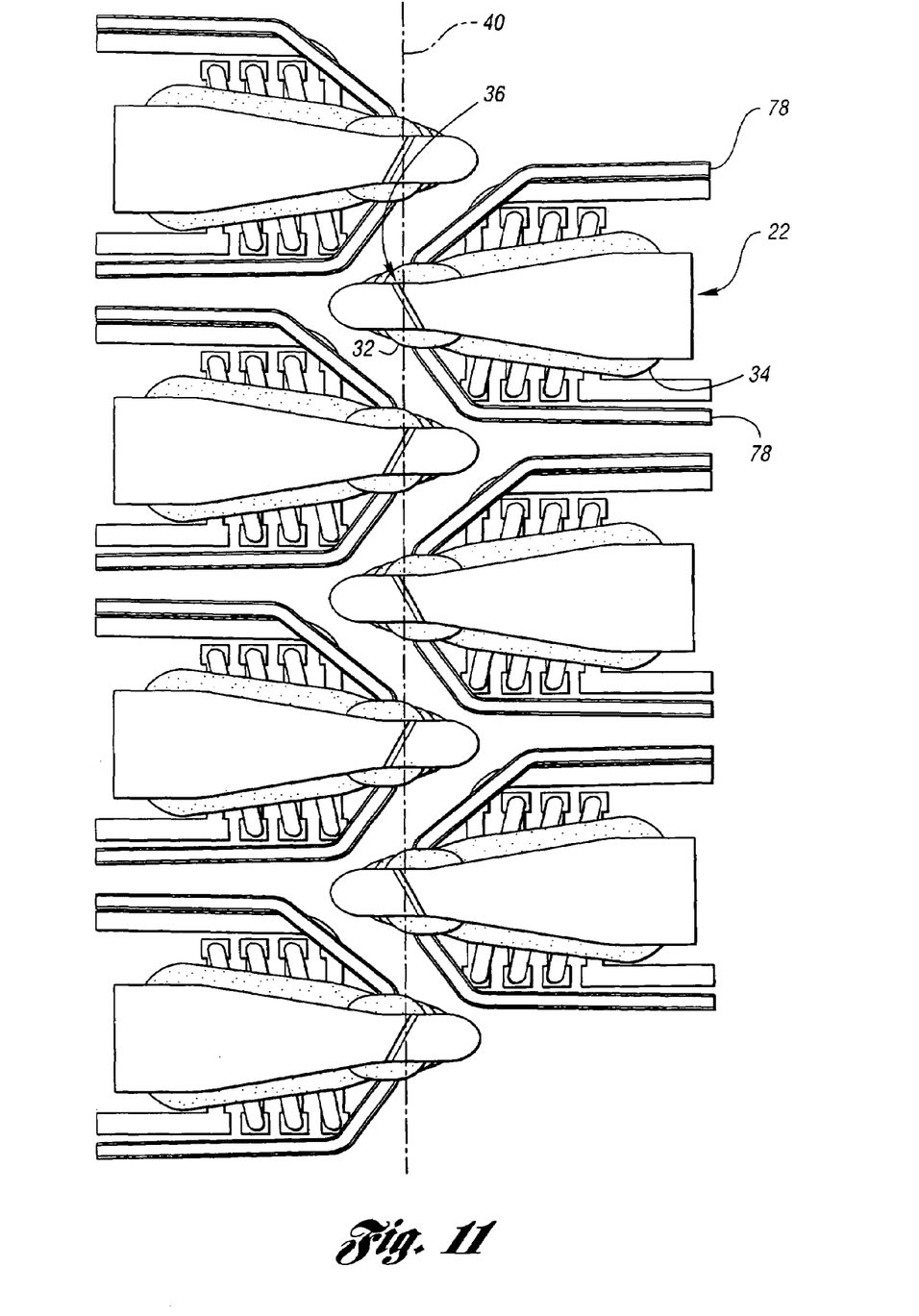
FIG. 11 is a drawing illustrating a top view of tape head write elements incorporating read elements according to an embodiment of the present invention.

Referring now to FIG. 11, a drawing illustrating a top view of tape head write elements incorporating read elements according to an embodiment of the present invention is shown. With reference also to FIG. 10b, front region 32 of yoke upper section 80 is located a greater distance from substrate 50 than is back region of yoke upper section 80. Read element 76 is located in insulating layer 76,82 beneath gap 36. Read element conductors 78 connect each read element 76 to cabling connected to tape head 20, not shown for clarity.

Figure 12:
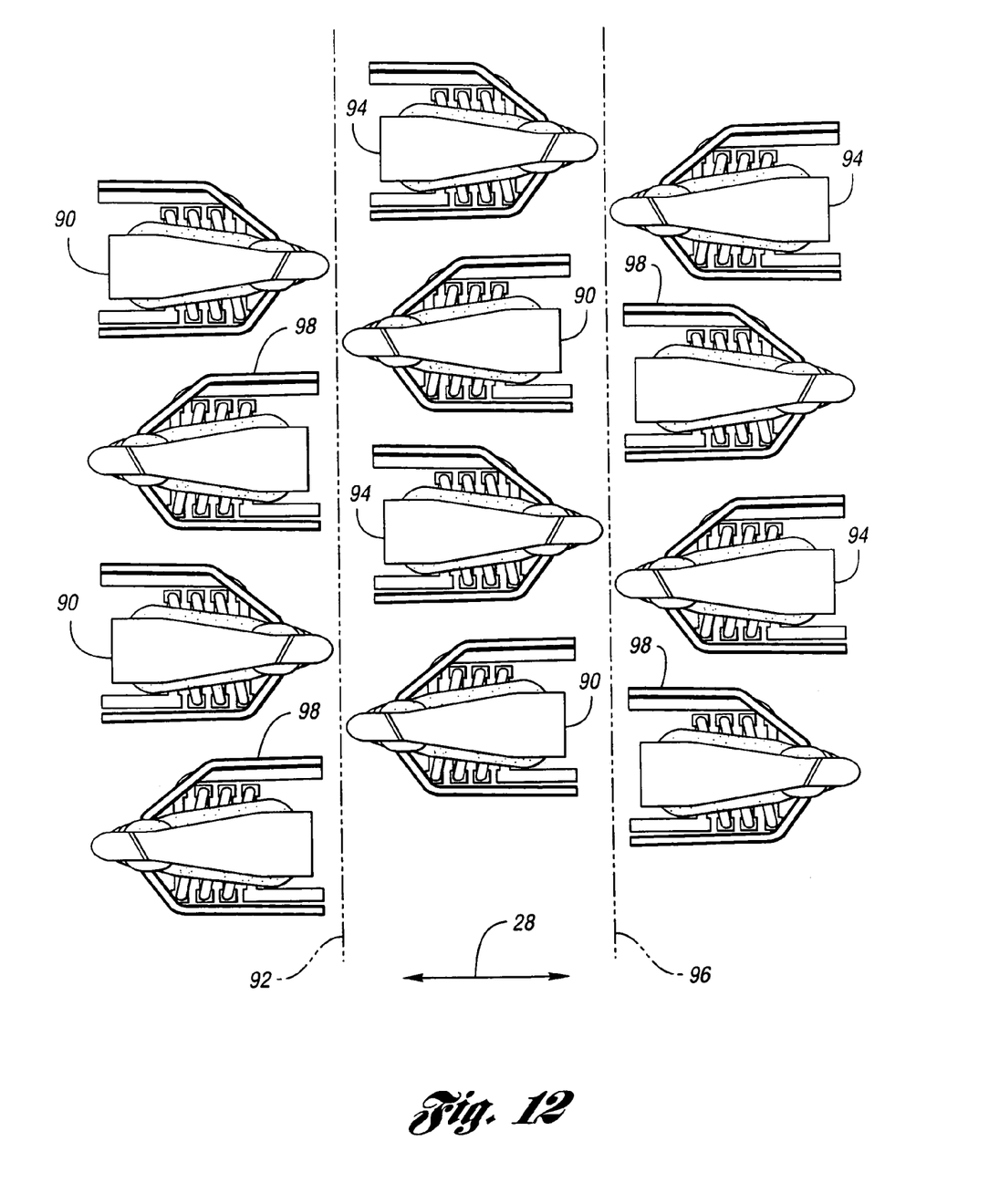
FIG. 12 is a drawing illustrating a top view of tape head write elements substantially aligned along different position lines according to an embodiment of the present invention.

Referring now to FIG. 12, a drawing illustrating a top view of tape head write elements substantially aligned along different position lines according to an embodiment of the present invention is shown. Write elements 22 may be divided into sets with each set having an associated position line 40. In the embodiment shown in FIG. 12, first set write elements, each of which is indicated by 90, are substantially aligned with first position line 92. Second set write elements, each of which is indicated by 94, are substantially aligned with second position line 96. By shifting the positions of write elements 90,94 along associated position lines 92,96, spacing between data tracks 24 may be reduced to any desired distance. Third set write elements, each of which is indicated by 98, may be substantially aligned with an associated position line 40 or may be interspersed within write elements 90,94 to reduce the width in tape direction 28 as shown in FIG. 12.

Additional embodiments of the present invention may be obtained by shifting write elements 22 along associated position lines 40 and by varying the spacing of each write element 22 away from position line 40. Thus, spacing between data tracks 24 may be reduced to any desired distance, including less than zero yielding overlapping data tracks 24. Multiple write elements 22 may be positioned to access the same data track 24. Further, position lines 40 may be oriented at any angle relative to tape direction 28 to provide a further narrowing of the effective distance between gaps 36. In some embodiments with multiple position lines 40, each write element gap angle 44 is opposite in sign from gap angle 44 of gap 36 operative to write an adjacent data track 24. As will be recognized by one of ordinary skill in the art, many layouts for packing write elements 22 on tape head 20 are possible within the spirit and scope of the present invention.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A magnetic recording head for writing multiple data tracks onto a magnetic media traveling across the head in a media direction, the head comprising a plurality of thin film write elements, each element having a front region defining a gap and a back region admitting loops of a conductive coil, a portion of each loop normal to the media direction, each gap aligned along a position line, yokes alternately positioned such that a first plurality of write elements has each back region on a first side of the position line and a second plurality of write elements has each back region on a second side of the position line opposite the first side.

2. A magnetic recording head as in claim 1 wherein the write elements are formed on a common substrate.

3. A magnetic recording head as in claim 1 wherein each write element is operative to inductively sense field patterns written onto a data track.

4. A magnetic recording head as in claim 1 wherein each write element contains a read element within the yoke beneath the gap.

5. A magnetic recording head as in claim 4 wherein each yoke comprises an upper section and a lower section separated in a portion of the yoke under the gap by an insulating layer containing the read element.

6. A magnetic recording head as in claim 4 wherein the read element is a flux sensing read element.

7. A magnetic recording head as in claim 1 wherein the position line is normal to the media direction.

8. A magnetic recording head as in claim 1 wherein the position line forms an acute angle with the media direction.

9. A magnetic recording head as in claim 1 wherein each gap has a gap angle with the position line, each write element gap angle opposite in sign from the gap angle of the gap on an adjacent write element.

10. A magnetic recording head as in claim 1 wherein the magnetic media is magnetic tape.

11. A magnetic recording head as in claim 1 further comprising at least one additional plurality of write elements, each additional plurality of write elements having an associated position line, each write element in the at least one additional plurality of write elements having a gap substantially aligned along the associated position line.

12. A magnetic recording head as in claim 11 wherein each write element gap has a gap angle with the associated position line, each gap operative to write a data track on the magnetic media, each write element gap angle opposite in sign from the gap angle of a gap operative to write an adjacent data track.

13. A magnetic recording head for writing multiple tracks onto magnetic media traveling across the recording head, the recording head comprising a plurality of thin film write elements, each write element comprising a yoke having a back region and a front region extending from the back region when viewed in a plane parallel to the magnetic media, the front region forming a gap and the back region admitting loops of a conductive coil, a portion of each loop normal to media traveling across the recording head, wherein a position line extends across the plane and intersects the projection of each track onto the plane and wherein the write elements are arranged with the yoke front regions aligned across the position line and the yoke back regions in a first plurality of write elements lying on a first side of the position line and a second plurality of write elements lying on a second side of the position line opposite of the first side.

14. A magnetic recording head as in claim 13 wherein each gap is a thin opening across the yoke front region in the plane, the thin opening defining an associated gap axis through the longest portion of the gap, each gap formed at a gap angle between the position line and the associated gap axis, wherein the gap angle magnitude is the same for each write element and the gap angle sign is opposite between adjacent write elements.

15. A magnetic recording head as in claim 13 wherein each write element is operative to inductively sense field patterns written onto a track on the magnetic media.

16. A magnetic recording head as in claim 13 wherein each write element further comprises a read element located within the yoke front region beneath the gap.

17. A magnetic recording head as in claim 13 wherein the yoke width tapers gradually from the back region to the front region narrower than the back region.

18. A magnetic recording head as in claim 13 further comprising at least one additional plurality of write elements, each additional plurality of write elements having an associated position line, each write element in the at least one additional plurality of write elements having a gap substantially aligned along the associated position line.

19. A magnetic recording head as in claim 18 wherein each gap is a thin opening across the yoke front region in the plane, the thin opening defining an associated gap axis through the longest portion of the gap, each gap formed at a gap angle between the position line and the associated gap axis, wherein the gap angle magnitude is the same for each write element and the gap angle sign is opposite between write elements operative to write adjacent data tracks.

20. A magnetic recording head as in claim 13 wherein the position line is normal to the direction the magnetic media travels across the recording head.

21. A magnetic recording head as in claim 13 wherein the position line is at an acute angle with the direction magnetic media travels across the recording head.

22. A magnetic recording head for writing multiple data tracks onto magnetic media traveling in a media direction over the head, the head including a plurality of write elements, each write element comprising:
   a substrate parallel to the magnetic media as the magnetic media travels by the head;
   a first magnetic layer deposited on a portion of the substrate, the first magnetic layer forming a lower section of a yoke;
   an insulating layer deposited over a center portion of the yoke lower section;
   a second magnetic layer deposited over the insulating layer and the portions of the yoke lower section not covered by the insulating layer, the second magnetic layer forming an upper section of the yoke, the yoke upper section having a back region and a front region extending from the back region, the yoke upper section front region defining a gap; and
   a conductive coil comprising a plurality of loops, each loop having a portion passing within the yoke such that at least a portion of each loop is normal to the substrate;

wherein the gap of each write element is aligned along a position line, the yokes alternately positioned such that a first plurality of write elements has each back region on a first side of the position line and a second plurality of write elements has each back region on a second side of the position line opposite the first side.

23. A magnetic recording head as in claim 22 wherein each loop of the conductive coil encircles the yoke lower section such that at least one portion of each loop passes below the yoke lower section.

24. A magnetic recording head as in claim 22 wherein each loop of the conductive coil encircles the yoke upper section such that at least one portion of each loop passes above the yoke upper section.

25. A magnetic recording head as in claim 22, each write element having an orientation direction defined by a line from the yoke back region to the yoke front region, wherein each write element has at least one adjacent write element having the opposite orientation direction.

26. A magnetic recording head as in claim 25 wherein the front region of each write element yoke upper section is adjacent to the yoke upper section front region of the at least one neighboring write element.

27. A magnetic recording head as in claim 26, the gap comprising a thin slit across the yoke upper section front region at a gap angle relative to the written data track, wherein the gap angle of each write element is different than the gap angle of the at least one neighboring write element.

28. A magnetic recording head as in claim 22 wherein each write element is operative to inductively sense field patterns written onto a magnetic media data track.

29. A magnetic recording head as in claim 22 wherein the yoke upper section front region is located a greater distance from the substrate than the yoke upper section back region.

30. A magnetic recording head as in claim 29 further comprising a read element located in the insulating layer beneath the gap in the yoke upper section front region.

31. A magnetic recording head as in claim 30 wherein the read element is a magnetoresistive read element.

32. A magnetic recording head as in claim 22 wherein the yoke upper section back region gradually tapers to the width of the narrower yoke upper section front region.

33. A magnetic recording head as in claim 22 wherein the magnetic media is magnetic tape.

\* \* \* \* \*